US009064106B2

(12) United States Patent
Okita et al.

(10) Patent No.: US 9,064,106 B2
(45) Date of Patent: Jun. 23, 2015

(54) METHOD AND APPARATUS TO KEEP CONSISTENCY OF ACLS AMONG A META DATA SERVER AND DATA SERVERS

(75) Inventors: Hideki Okita, Sunnyvale, CA (US); Takahiro Nakano, Lexington, MA (US)

(73) Assignee: HITACHI, LTD., Tokyo (JP)

( * ) Notice: Subject to any disclaimer, the term of this patent is extended or adjusted under 35 U.S.C. 154(b) by 27 days.

(21) Appl. No.: 13/456,091

(22) Filed: Apr. 25, 2012

(65) Prior Publication Data

US 2013/0291066 A1    Oct. 31, 2013

(51) Int. Cl.
*H04L 29/06* (2006.01)
*G06F 21/44* (2013.01)
*G06F 21/53* (2013.01)
*G06F 21/62* (2013.01)
*H04W 12/06* (2009.01)

(52) U.S. Cl.
CPC ............. *G06F 21/44* (2013.01); *G06F 21/53* (2013.01); *G06F 21/6218* (2013.01); *H04L 63/08* (2013.01); *H04L 63/10* (2013.01); *H04W 12/06* (2013.01)

(58) Field of Classification Search
USPC .......................................................... 726/4
See application file for complete search history.

(56) References Cited

U.S. PATENT DOCUMENTS 7,966,383 B2 * 6/2011 Cao et al. ....................... 709/218
7,979,416 B1   7/2011 Santry et al.
8,086,585 B1 * 12/2011 Brashers et al. ............... 707/705
8,135,385 B2 *  3/2012 Ohta et al. ...................... 455/411
2009/0144416 A1 *  6/2009 Chatley et al. ................. 709/224
2011/0145363 A1 *  6/2011 Ananthanarayanan et al. .............................. 709/218
2011/0282923 A1 * 11/2011 Maruyama et al. ............ 707/827
2012/0110312 A1 *  5/2012 Domsch et al. .................. 713/2

OTHER PUBLICATIONS

A Survey of Web Caching Schemes for the Internet|https://ecommons.library.cornell.edu/bitstream/1813/7401/1/99-1747.pdf|Wang et al.|1999|pp. 1-21.*
RFC 5662, Black et al. (Parallel NFS (pNFS) Block/Volume Layout, Internet Engineering Task Force (IETF), Jan. 2010.
RFC 5661, Shepler et al. Network File System (NFS) Version 4.1, Internet Engineering Task Force (IETF), Jan. 2010.
European Patent Application No. 12194096.9-1853; Extended European Search Report dated on Jul. 15, 2013.

* cited by examiner

*Primary Examiner* — Mahfuzur Rahman
(74) *Attorney, Agent, or Firm* — Procopio, Cory, Hargreaves & Savitch LLP

(57) ABSTRACT

Exemplary embodiments may involve a meta-data server that manages data-server access control list (DS ACL) information. Each entry of this DS ACL information may include an address of a data server, an identification or a range address of chunk data on the data server, a file path of the chunk data in the file tree provided by the meta-data server, and addresses of the permitted clients. The meta-data server may determine the addresses of the permitted clients for the chunk data by retrieving the original file path of chunk data from layout information of the meta-data server, and by retrieving the entry containing the directory path that partially matches with the original file path from an access control list of the meta-data server.

17 Claims, 25 Drawing Sheets

| Network Address | DS File Handle | Original File Path | Permitted IP Segment |
|---|---|---|---|
| 10.0.20.11 | 0x11 | /dir1/file1.dat | 192.168.1.0/24 |
| 10.0.20.12 | 0x12 | /dir1/file1.dat | 192.168.1.0/24 |
| 10.0.20.11 | 0x21 | /dir2/file2.dat | 192.168.2.0/24 |
| 10.0.20.12 | 0x22 | /dir2/file2.dat | 192.168.2.0/24 |

Fig. 6

| Directory | DS-Permitted IP Segment |
|---|---|
| /dir1 | 192.168.101.0/24 |
| /dir2 | 192.168.102.0/24 |

Fig. 7

| Filename | File handle | File offset | length | Layout type | Device ID | DS File handle list |
|---|---|---|---|---|---|---|
| /dir1/file1.dat | 0x1 | 0 | 9000 | FILES | nfsstr1 | {0x11, 0x12} |
| /dir2/file2.dat | 0x2 | 9000 | 5000 | FILES | nfsstr1 | {0x21, 0x22} |

Fig. 9

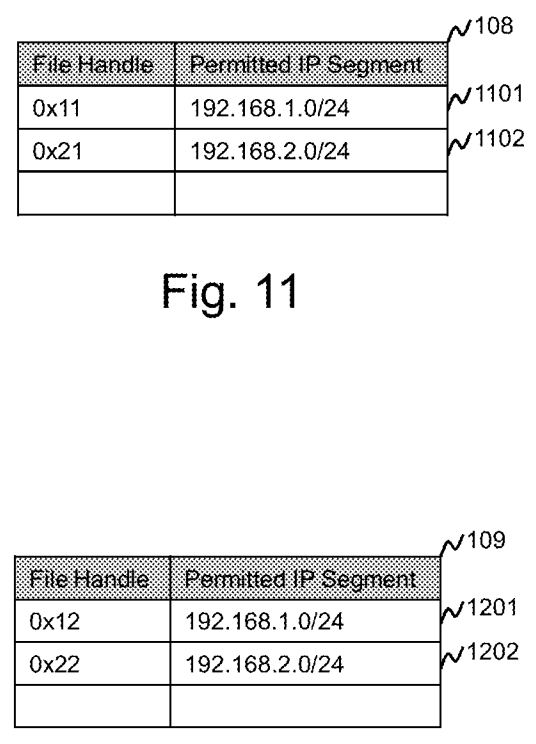

| File Handle | Permitted IP Segment |
|---|---|
| 0x11 | 192.168.1.0/24 |
| 0x21 | 192.168.2.0/24 |
|  |  |

Fig. 11

| File Handle | Permitted IP Segment |
|---|---|
| 0x12 | 192.168.1.0/24 |
| 0x22 | 192.168.2.0/24 |
|  |  |

Fig. 12

| Volume ID | Range Start | Range End | Original File Path | Permitted IQN List |
|---|---|---|---|---|
| vol1 | 0 | 4499 | /dir1/file1.dat | {iqn.2012-01.com.hitachi.hal:adaptor.0001, iqn.2012-01.com.hitachi.hal:adaptor.0002} |
| vol1 | 4500 | 6999 | /dir2/file2.dat | {iqn.2012-01.com.hitachi.hal:adaptor.0003, iqn.2012-01.com.hitachi.hal:adaptor.0004} |
| vol2 | 0 | 4499 | /dir1/file1.dat | {iqn.2012-01.com.hitachi.hal:adaptor.0001, iqn.2012-01.com.hitachi.hal:adaptor.0002} |
| vol2 | 4500 | 6999 | /dir2/file2.dat | {iqn.2012-01.com.hitachi.hal:adaptor.0003, iqn.2012-01.com.hitachi.hal:adaptor.0004} |
| | | | | |

Fig. 18

| Client IP Address | IQN |
|---|---|
| 192.168.1.101 | iqn.2012-01.com.hitachi.hal:adaptor.0001 |
| 192.168.1.102 | iqn.2012-01.com.hitachi.hal:adaptor.0002 |
| 192.168.2.103 | iqn.2012-01.com.hitachi.hal:adaptor.0003 |
| 192.168.2.104 | iqn.2012-01.com.hitachi.hal:adaptor.0004 |

Fig. 19

| Filename | File handle | Device ID | File offset | length | Layout type | Storage Offset |
|---|---|---|---|---|---|---|
| /dir1/file1.dat | 0x1 | vol1 | 0 | 4500 | BLOCK | 0 |
| /dir1/file1.dat | 0x1 | vol2 | 4500 | 4500 | BLOCK | 0 |
| /dir2/file2.dat | 0x2 | vol2 | 0 | 2500 | BLOCK | 4500 |
| /dir2/file2.dat | 0x2 | vol2 | 2500 | 2500 | BLOCK | 4500 |

Fig. 20

| Range Start | Range End | Permitted IQN List |
|---|---|---|
| 0 | 4499 | {iqn.2012-01.com.hitachi.hal:adaptor.0001, iqn.2012-01.com.hitachi.hal:adaptor.0002} |
| 4500 | 6999 | {iqn.2012-01.com.hitachi.hal:adaptor.0003, iqn.2012-01.com.hitachi.hal:adaptor.0004} |
| | | |

Fig. 21

| Volume ID | Range Start | Range End | Original File Path | Permitted FC WWN List |
|---|---|---|---|---|
| vol1 | 0 | 4499 | /dir1/file1.dat | 10:00:00:00:00:00:10:00:01, 10:00:00:00:00:00:10:00:02 |
| vol1 | 4500 | 6999 | /dir2/file2.dat | 10:00:00:00:00:00:10:00:03, 10:00:00:00:00:00:10:00:04 |
| vol2 | 0 | 4499 | /dir1/file1.dat | 10:00:00:00:00:00:10:00:01, 10:00:00:00:00:00:10:00:02 |
| vol2 | 4500 | 6999 | /dir2/file2.dat | 10:00:00:00:00:00:10:00:03, 10:00:00:00:00:00:10:00:04 |

Fig. 24

| Client IP Address | FC WWN |
|---|---|
| 192.168.1.101 | 10:00:00:00:00:10:00:01 |
| 192.168.1.102 | 10:00:00:00:00:10:00:02 |
| 192.168.2.103 | 10:00:00:00:00:10:00:03 |
| 192.168.2.104 | 10:00:00:00:00:10:00:04 |
|  |  |

Fig. 25

| Range Start | Range End | Original File Path | Permitted FC WWN List |
|---|---|---|---|
| 0 | 4499 | /dir1/file1.dat | {10:00:00:00:00:10:00:01, 10:00:00:00:00:10:00:02} |
| 4500 | 6999 | /dir2/file2.dat | {10:00:00:00:00:10:00:03, 10:00:00:00:00:10:00:04} |
|  |  |  |  |

METHOD AND APPARATUS TO KEEP CONSISTENCY OF ACLS AMONG A META DATA SERVER AND DATA SERVERS

BACKGROUND

1. Field

The exemplary embodiments relate to network file sharing systems and, more particularly, to a methods and apparatuses to transfer shared files to clients.

2. Technical Background

In related art applications, network file systems may be utilized for sharing business data and documents that are created and saved as electronic files. The network file system may utilize a client-server architecture. A client of the system may send a request to a file server and receive file data as a response to the request. The clients may assemble a file from the received data.

To improve the performance of the network file system, the related art applications have extended the architecture of the network file system by use of a distributed file system. Related art implementations of the extended architecture involve multiple file servers called data servers (DSs) that have distributed file data, and a management server called a meta-data server (MDS) that manages the location of the distributed file data. In the related art implementations, a client may send multiple requests in parallel to the multiple file servers. The multiple accesses may multiply the throughput of file access according to the number of file servers.

Related art implementations also utilize security requirements for the network file system to control the sharing of business data. To satisfy the security requirements, a security function called the Access Control List (ACL) may be used to secure the access to the data on a network file system. The ACL of the network file system is configured by an operator to export the data to specific users, user groups, or IP address segments. In other words, the ACL is a list of access control rules. In an example related art implementation, the ACL is implemented as a table. Each entry of the table may include a file path and an IP address segment. The network file system may decide on granting or denying access for each of network accesses to the files according to the contents of the ACL.

SUMMARY

Aspects of the exemplary embodiments include a meta data server coupled to a plurality of client computers and a plurality of data servers, which may include a memory configured to store a relationship between a group including a plurality of first identification information, and a second identification information associated with a client computer from the plurality of client computers, the client computer having permission to access a data related to the group, wherein each of the plurality of first identification information includes data from a data server of the plurality of data servers, the data server of the each of the plurality of first identification information being different from other ones of the plurality of data servers associated with other ones of the plurality of first identification information; and a controller operable to manage the relationship and to control access from the client computer to the data server based on the relationship in the memory.

Additional aspects of the exemplary embodiments further include a system, which involves a plurality of client computers; a plurality of data servers; and a meta data server coupled to the plurality of client computers and the plurality of data servers. The meta data server may include a memory configured to store a relationship between a group including a plurality of first identification information, and a second identification information associated with a client computer from the plurality of client computers, the client computer having permission to access a data related to the group, wherein each of the plurality of first identification information includes data from a data server of the plurality of data servers, the data server of the each of the plurality of first identification information being different from other ones of the plurality of data servers associated with other ones of the plurality of first identification information; and a controller operable to manage the relationship and to control access from the client computer to the data server based on the relationship in the memory.

Additional aspects of the exemplary embodiments may include a non-transitory computer readable medium storing instructions for operating a meta data server. The instructions may include managing a relationship between a group comprising a plurality of first identification information, and a second identification information associated with a client computer from the plurality of client computers, the client computer having permission to access a data related to the group, wherein each of the plurality of first identification information includes data from a data server of the plurality of data servers, the data server of the each of the plurality of first identification information being different from other ones of the plurality of data servers associated with other ones of the plurality of first identification information; and controlling access from the client computer to the data server based on the relationship in the memory.

BRIEF DESCRIPTION OF THE DRAWINGS

These, and or/other aspects will become more readily appreciated from the following description of the exemplary embodiments, taken in conjunction with the accompanying drawings, in which:

FIG. 6 illustrates a configuration of the DS ACL entry information, in accordance with an exemplary embodiment.

FIG. 7 shows an example of the structure of the DS permitted IP segment information, in accordance with an exemplary embodiment.

FIG. 9 illustrates a configuration of layout information, in accordance with an exemplary embodiment.

FIGS. 11 and 12 illustrate a configuration of the DS ACLs, in accordance with an exemplary embodiment.

FIG. 18 illustrates an example structure of the DS ACL entry information in accordance with an exemplary embodiment.

FIG. 19 illustrates an example of the structure of the client adaptor information, in accordance with an exemplary embodiment.

FIG. 20 illustrates an example of the layout information, in accordance with an exemplary embodiment.

FIG. 21 illustrates an example structure of DS ACLs, in accordance with an exemplary embodiment.

FIG. 24 illustrates an example of the DS ACL entry information of the MDS, in accordance with an exemplary embodiment.

FIG. 25 illustrates an example structure of the client adaptor information, in accordance with an exemplary embodiment.

FIG. 26 illustrates an example structure of the DS ACLs, in accordance with an exemplary embodiment.

DETAILED DESCRIPTION

Figure 1:
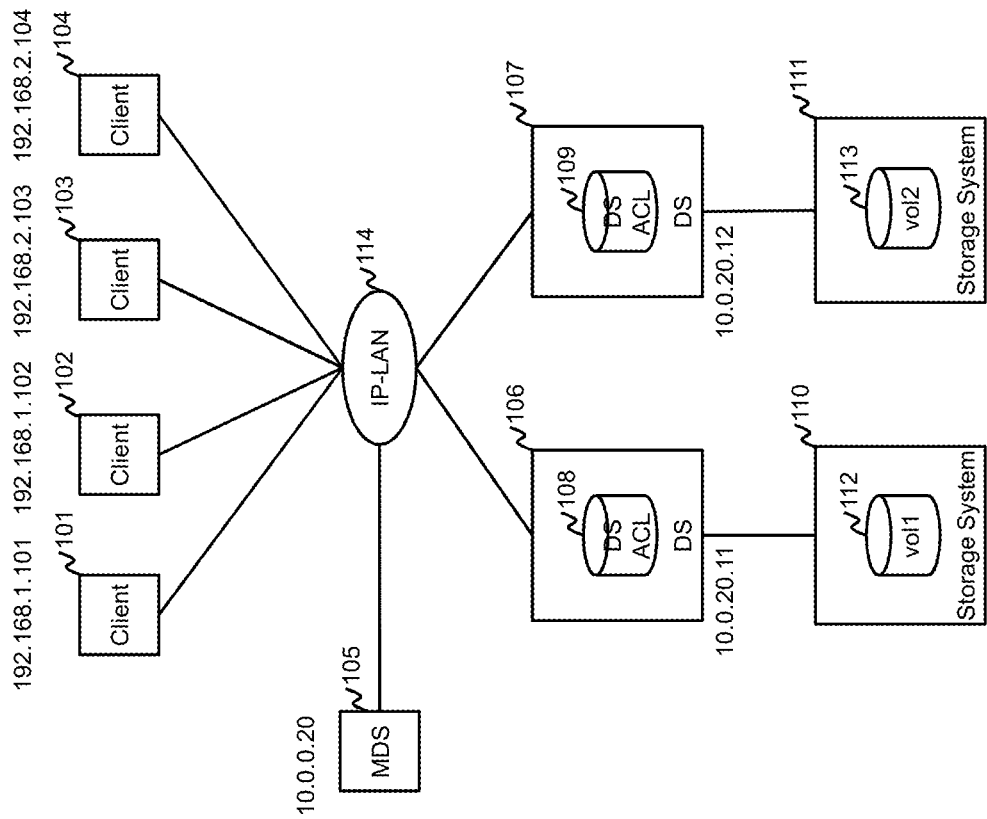
FIG. 1 illustrates an example of a distributed network file system in accordance with an exemplary embodiment.

When the related art ACL function is used in a distributed file system, malicious users may access the data in the system without the requisite credentials. One reason is that in a distributed file system such as the parallel Network File System (pNFS), the control path and the data path may be separated. Even if the operator of the system configures an ACL of an MDS to prevent access by an unauthorized user. The unauthorized user may be able to directly access chunk data stored on the DS by using a data access protocol such as the Network File System (NFS) protocol for a file layout pNFS system, and the iSCSI/Fibre Channel (FC) for a block layout pNFS system. Further, it may be difficult to use the ACL functions of the DSs to prevent such malicious access, since the operator may not be able to determine required ACL rules for each chunk data on the DS. In related art implementations, the directory tree and the file names may be different between the MDS and the DS.

Additionally, related art pNFS systems using a block layout cannot control an access to a DS according to an ACL of the MDS, because the identification of a client's adaptor is an iSCSI Qualified Name (IQN) or a FC World Wide Name (WWN). The reason is that the client may utilize iSCSI (which uses IQN) or FC (which uses FC WWN) to identify the source of data access requests, which may not be tracked in the MDS ACL.

Exemplary embodiments described herein may prevent such undesirable access to the data stored on the data servers of the distributed file system when the control path and the data path are separated. Basic implementations of the exemplary embodiments may include an MDS with various feature. One such feature may include management of a DS Access Control List) ACL (, which contains entries of an identification of a data server (DS), an identification of data on a data server (DS), and identification of permitted clients, if any. The entries may be generated by determining the correspondence between each chunk data on the DSs and an entry of the ACL of the MDS, based on layout information of the MDS and an ACL of the MDS.

Exemplary embodiments described herein may also utilize various identification information to map permitted client computers to specific data locations. For example, a group of servers may be organized by a first identification information, which is organized by the data represented within the server. A second identification information may also be utilized to associate with a client computer from a plurality of client computers having permission to access the plurality of data related to the group. Exemplary embodiments may thereby manage a relationship of client and server based on the first and second identification information.

Exemplary embodiments described herein may operate in two modes. A first mode may operate as a static mode, in which an open processing program is operable to configure a plurality of data servers to control access from the plurality of client computers. In the static mode, a file handle may be provided to indicate accessible data. A second mode may operate as a dynamic mode, in which a layout processing program is operable to configure the plurality of data servers to control access from the plurality of client computers identification information of permitted clients. In the dynamic mode, layout information, such as particular chunks of the storage, may be provided to indicate accessible data. The exemplary embodiments can operate in either mode, and may also switch modes depending on the configuration (e.g. file layout versus block layout, etc.) Further details are described below.

First Exemplary Embodiment

File Layout Using NFS

In a first exemplary embodiment, a file layout using NFS is utilized. In accordance with the first embodiment, a meta-data server (MDS) contains DS Access Control List (ACL) information, which has entries for a network address of a data server (DS), a file handle of a chunk file on the DS, an original file path, et Protocoland an Intern (IP) address segment to which the chunk file is exported. The MDS may retrieve the original file path of the chunk file on a DS according to the layout information and device group information. The MDS may then retrieve the export IP segment corresponding to the file path from MDS ACL.

FIG. 1 illustrates a distributed network file system in accordance with an exemplary embodiment. The exemplary distributed network file system includes a meta-data server (MDS) 105 that provides file-layout capability.

In accordance with an exemplary embodiment, the distributed network file system may involve multiple clients 101-104, an MDS 105, and multiple data servers (DSs) 106 and 107 with DS Access Control Lists (ACLs) 108 and 109 respectively. These components may be connected each other via an IP Local Area Network (IP-LAN) 114. In this IP-LAN 114, IP addresses 192.168.1.101, 192.168.1.102, 192.168.2.103, 192.168.2.104, 10.0.0.20, and 10.0.20.11-12 are assigned to clients 101-104, the MDS 105, and the DSs 106 and 107, respectively. The system may further include multiple storage systems 110 and 111 that provide volumes 112 and 113, respectively. In the example provided in FIG. 1, the two storage systems 110 and 111 are connected to the DSs 106 and 107, respectively.

Figure 2:
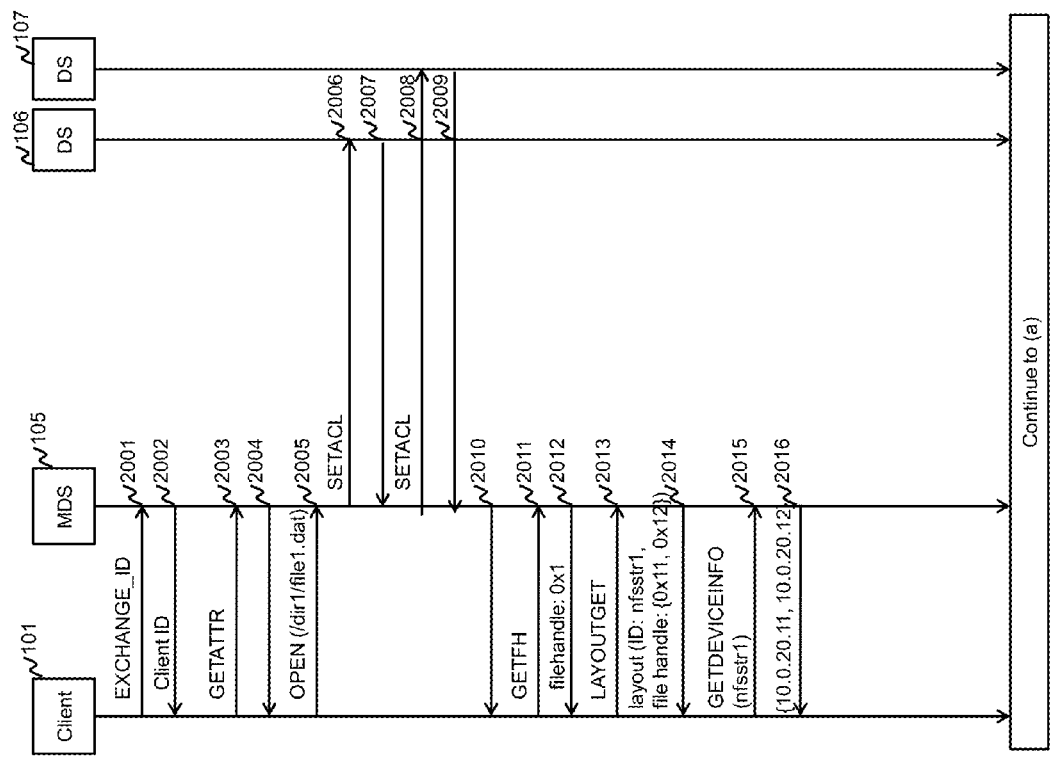
FIG. 2 illustrates a first part of a message sequence in accordance with an exemplary embodiment.

FIG. 2 illustrates a first part of a message sequence in accordance with an exemplary embodiment. FIG. 2 illustrates a first part of an example of the message sequence between one of the clients 101, the MDS 105, and DSs 106 and 107. In the example of FIG. 2, the MDS 105 works in a static mode, in which the MDS 105 sets the DS ACLs 108 and 109 at the time of the file creation.

At the start of the message sequence, a pNFS client 101 sends an EXCHANGE ID message and a GETATTR message to the MDS 105 and receives capabilities (e.g. Client ID) of the MDS 105, as shown at 2001, 2002, 2003, and 2004. At 2005, the pNFS also sends an OPEN message to create and open a new file whose file path is "'/dir1/file1.dat".

In the example depicted in FIG. 2, "/dir1/file1.dat" does not yet exist in the distributed file system. When the MDS receives the OPEN message, as an additional process, the MDS sends requests at 2006 and 2008 to the DSs 106 and 107, respectively to update their ACLs 108 and 109 to permit access only from permitted IP addresses as described in the ACL of MDS. The DSs 106 and 107 transmit acknowledgements at 2007 and 2009. After completing the ACL update, the MDS 105 sends a response for the OPEN message at 2010 to the pNFS client 101.

After the above file open process and the updates of the DS ACLs 108 and 109, the pNFS client 101 sends a GETFH message at 2011 to the MDS 105 to get the file handle 0x1 of the above newly created file. The MDS 105 transmits the filehandle 0x1 at 2012 to the pNFS client 101. The pNFS client 101 then sends a LAYOUTGET message at 2013 to the MDS 105 to retrieve the layout data of the new file. In this example of FIG. 2, the MDS 105 returns at 2014, a layout with a device ID "nfsstr1" and a set of file handles "0x11 and 0x12". At 2015, the pNFS client 101 retrieves network addresses corresponding to the device ID "nfsstr1" by sending a GETDEVICEINFO message to the MDS 105. At 2016, the MDS 105 transmits a set of network addresses "10.0.20.11" and "10.0.20.12" to the pNFS client 101.

Figure 3:
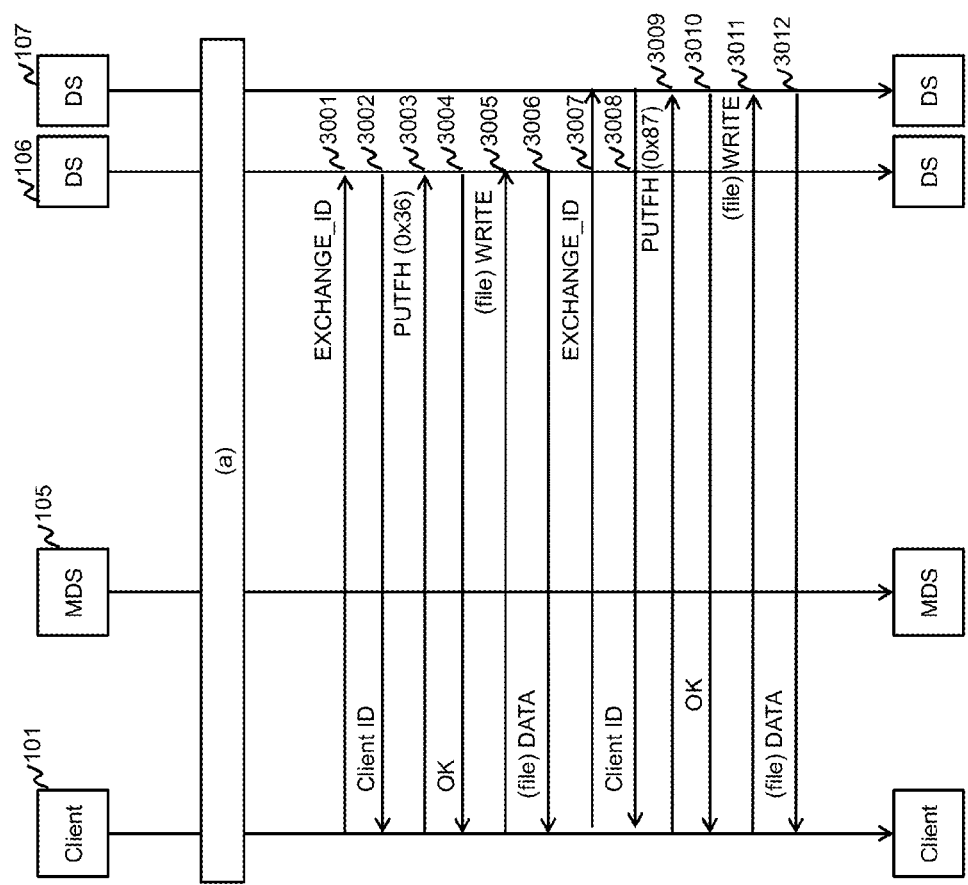
FIG. 3 shows a second part of the message sequence corresponding to the first part of the message sequence shown in FIG. 2, in accordance with an exemplary embodiment.

FIG. 3 shows a second part of the message sequence corresponding to the first part of the message sequence shown in FIG. 2, in accordance with an exemplary embodiment.

Based on the received network addresses, the pNFS client 101, sends an EXCHANGE ID message at 3001 and 3007, a PUTFH message at 3003 and 3009 and WRITE message at 3005 and 3011 in turn to the DSs 106 and 107 to write data of the new file to the volume 112 and 113. The DSs 106 and 107 send their acknowledgements/responses to the EXCHANGE ID message at 3002 and 3008, the PUTFH message at 3004 and 3010, and the WRITE message at 3006 and 3012, respectively.

Figure 4:
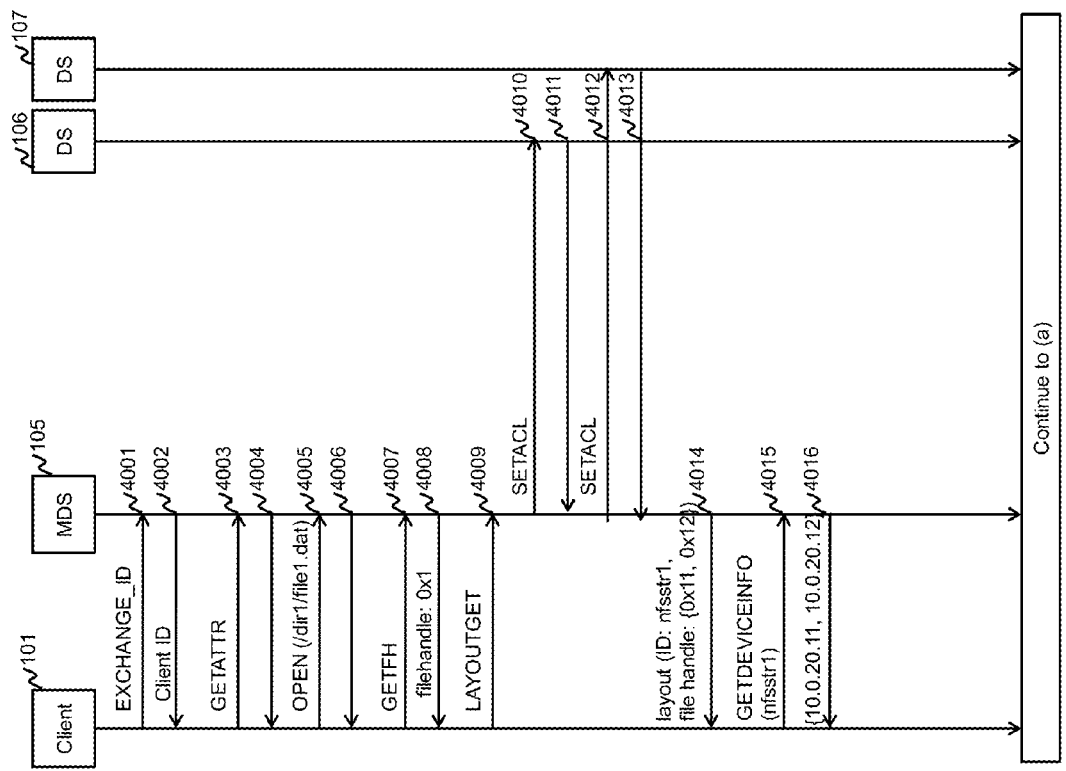
FIG. 4 illustrates the first part of another message sequence in accordance with an exemplary embodiment.

FIG. 4 shows the first part of the example of the message sequence between one of the clients 101, the MDS 105, and DSs 106 and 107, in accordance with an exemplary embodiment. Specifically, FIG. 4 illustrates an example sequence that the MDS 105 works in a "dynamic mode", in which the MDS 105 sets the DS ACLs 108 and 109 at the time of retrieval of layout information.

At the start of the message sequence, a pNFS client 101 sends an EXCHANGE ID message at 4001 and a GETATTR message at 4003, to the MDS 105 to check the capabilities of the MDS 105. The MDS responds to the messages at 4002 and 4004, respectively. The pNFS client 101 then sends an OPEN message at 4005 to create and open a new file. In the example of FIG. 4, the file path of the new file is "/dir1/file1.dat", which the MDS stores in the distributed file system and responds to the OPEN message at 4006. The pNFS client 101 then sends a GETFH message at 4007 to the MDS 105 to retrieve the file handle of the above newly created file. In the example of FIG. 4, the file handle "0x1" is transmitted from the MDS 105 to the pNFS client 101.

After the above file open process, the pNFS client 101 sends a LAYOUTGET message at 4009, to the MDS 105. When the MDS 105 receives the LAYOUTGET message, MDS 105 requests the DSs 106 and 107 to update their ACLs 108 and 109 at 4010 and 4012, respectively, to permit access only from permitted IP addresses as described in the ACL of MDS 105. DSs 106 and 107 transmit responses 4011 and 4013, respectively, to MDS 105 upon updating ACLs 108 and 109. After completing the ACL update, the MDS 105 sends a response to the LAYOUTGET message at 4014 to the pNFS client 101. In this example, the MDS 105 returns a layout with a device ID "nfsstr1" and a set of file handles (0x11, 0x12) at 4014. The pNFS client 101 retrieves network addresses corresponding to the device ID "nfsstr1" by sending a GETDEVICEINFO message at 4015 to the MDS 105 and receives a set of network addresses "10.0.20.11" and "10.0.20.12" at 4016.

In the first embodiment, the second part of the message sequence as shown in the FIG. 4 is the same as the sequence illustrated in FIG. 3, and is therefore omitted for clarity.

Figure 5:
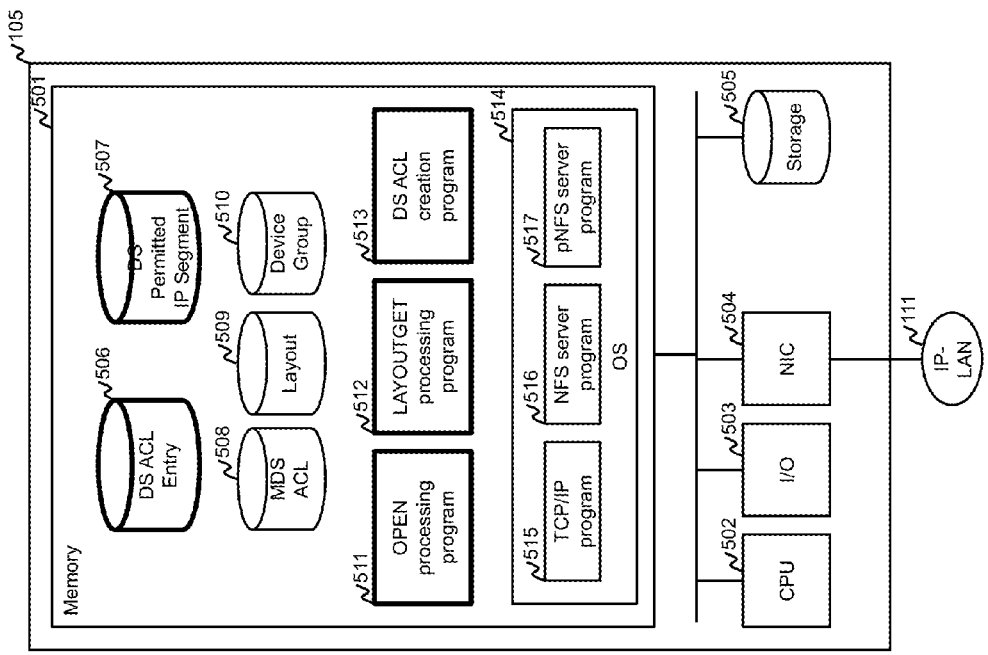
FIG. 5 illustrates a hardware configuration of the MDS, in accordance with an exemplary embodiment.

FIG. 5 illustrates a hardware configuration of the MDS, in accordance with an exemplary embodiment.

The MDS 105 may include a memory 501, a CPU 502, an I/O 503, a network interface card (NIC) 504, and an internal storage 505. The memory 501 stores DS ACL entry information 506 and DS permitted IP segment information 507. The memory 501 may also store MDS ACL information 508, layout information 509, and device group information 510. The memory 501 may also store an OPEN processing program 511, a LAYOUTGET processing program 512 and a DS ACL creation program 513. The memory 501 may also utilize an OS 514 that has a TCP/IP program 515, a NFS server program 516, and a pNFS server program 517.

FIG. 6 illustrates a configuration of the DS ACL entry information, in accordance with an exemplary embodiment.

As illustrated in FIG. 6, the DS ACL entry information 506 may be implemented as a table with entries including a set of a network address of a DS, a file handle of a chunk file in a DS (e.g. 106 or 107), an original file path, and an IP address that shows a permitted IP segment. In the example of FIG. 6, four entries 601, 602, 603 and 604 are stored in the DS ACL entry information 506. The content of the entries 601, 602, 603 and 604 illustrate that the data of two files "/dir1/file1.dat" and "/dir2/file2.dat" is stored in two DSs that have network addresses 10.0.20.11 and 10.0.20.12 respectively. Entries 601, 602, 603 and 604 also illustrate that the data of two files is exported to IP segments "192.168.1.0/24" and "192.168.2.0/24", respectively.

In contrast to related art MDS implementations, the MDS 105 of exemplary embodiments manages entries of the DS ACLs 108 and 109. Each entry indicates the correspondence between an identification of chunk file on a DS 106 or 107, an identification of a file on a file tree of the MDS 105, and an IP segment that the chunk file is exported to.

FIG. 7 shows an example of the structure of the DS permitted IP segment information, in accordance with an exemplary embodiment. DS permitted IP segment information 507 may be implemented as a table with entries including a directory string and an IP address of a permitted IP segment. In this example, entry 701 indicates that clients in the segment "192.168.101.0/24" are permitted to access chunk files on the DSs 106 and 107 where the original data is stored in directory "/dir1" via data access protocol such as NFS, iSCSI, and FC. Entry 702 indicates that clients in the segment "192.168.102.0/24" are permitted to access chunk files on the DSs 106 and 107 where the original data is stored in directory "/dir2" via data access protocol such as NFS, iSCSI, and FC.

The DS permitted IP segment information 507 may be used such that the each of the pNFS clients 101, 102, 103 and 104 have at least two NICs that are connected to different IP segments. One of the IP segments may be used for the metadata access to the MDS 105, while another IP segment may be used for the data access to the DSs 106 and 107. Such separation of IP segments can be used for preventing control messages from loss due to data traffic in IP-LAN 114.

Figure 8:
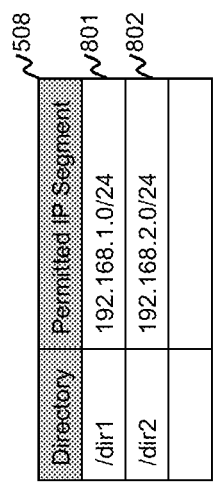
FIG. 8 illustrates a configuration of the MDS ACL information, in accordance with exemplary embodiments.

FIG. 8 illustrates a configuration of the MDS ACL information, in accordance with an exemplary embodiment. MDS ACL information 508 may be implemented as a table with entries including a set of a string of a directory path and an IP address of a permitted IP segment. In this example, clients in the segment "192.168.1.0/24" are permitted to access layout information about a directory "/dir1" on the MDS 105 via NFS. And also, clients in the segment "192.168.2.0/24" are permitted to access layout information about a directory "/dir2" on the MDS 105 via NFS.

Although the DS permitted IP segment information 507 has a similar configuration to the MDS ACL 508, the MDS 105 can manage different permitted IP segments for each of the control path to the MDS 105 and the set of data paths to DSs 106 and 107, by using both of the DS permitted IP segment information 507 and the MDS ACL 508.

FIG. 9 illustrates a configuration of layout information, in accordance with an exemplary embodiment. Layout information 509 may be implemented as a table with entries 901, 902 for a file in a file tree of the MDS 105. Entries 901, 902 may include a file name of the file, a file handle of the file, a file offset of the file, the length of the file, the layout type of the file, a device ID, and a list of file handles of chunk files stored in the DSs 106 and 107.

In the example of FIG. 9, entries 901 and 902 of the layout information 509 indicate that data of two files "/dir1/file1.dat" and "/dir2/file2.dat" is stored in a group of DSs named "nfsstr1". The first entry 901 indicates that the file "/dir1/file1.dat" is distributed to multiple DSs in the form of two chunk files that have file handles 0x11 and 0x12, respectively. Similarly, the second entry 902 indicates that the file "/dir2/file2.dat" is distributed to multiple DSs in the form of two chunk files that have file handles 0x21 and 0x22.

Figure 10:
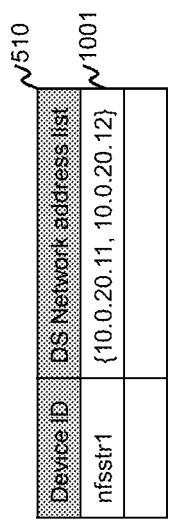
FIG. 10 illustrates a configuration of the device group information, in accordance with an exemplary embodiment.

FIG. 10 illustrates a configuration of the device group information, in accordance with an exemplary embodiment. The device group information 510 may be implemented as a table which contains entries that include a device ID and a list of DS network addresses. The entries may be used to manage the correspondence between a device ID such as "nfsstr1" and a group of DSs such as the DSs 106 and 107. In the example of FIG. 10, entry 1001 indicates that device ID "nfsstr1" corresponds to DSs "10.0.20.11" and "10.0.20.12".

FIGS. 11 and 12 illustrate a configuration of the DS ACLs, in accordance with an exemplary embodiment. Specifically, FIG. 11 illustrates an example table configuration of DS ACL 108, where each entry corresponds to a file in the DS 106. Entries may include file handles of chunk files in the DS 106. In this example, the first entry 1101 indicates that users in the IP segment 192.168.1.0/24 are permitted to access the file with file handle 0x11 on the DS 106. The second entry 1102 indicates that users in the IP segment 192.168.2.0/24 are permitted to access the file with file handle 0x21 on the DS 106.

Similarly, FIG. 12 illustrates a table configuration of DS ACL 109, where each entry corresponds to a file in the DS 107. In this example, the first entry 1201 indicates that users in the IP segment 192.168.1.0/24 are permitted to access the file with file handle 0x11 on the DS 107. The second entry 1202 indicates that users in the IP segment 192.168.2.0/24 are permitted to access the file with file handle 0x22 on the DS 107.

Figure 13:
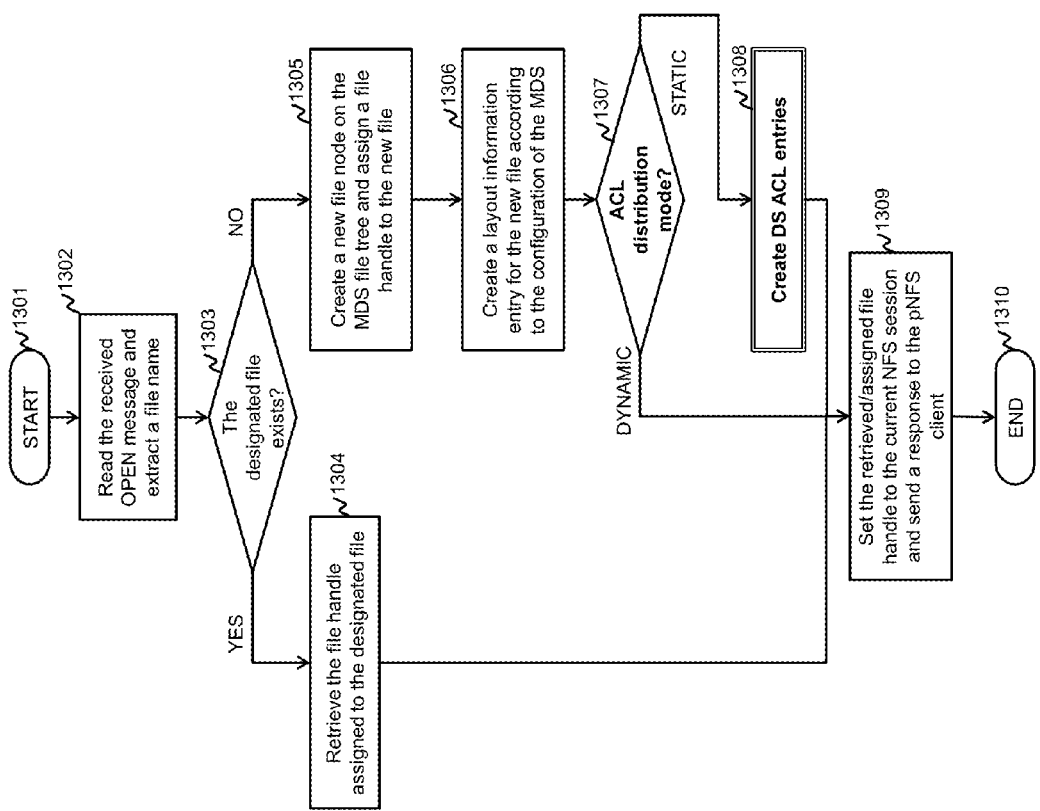
FIG. 13 illustrates a flow chart of the OPEN processing program of the MDS, in accordance with an exemplary embodiment.

FIG. 13 illustrates a flow chart of the OPEN processing program 511 of the MDS 105, in accordance with an exemplary embodiment. OPEN processing program 511 may be launched when the MDS 105 receives an OPEN message from the pNFS clients 101-104. At 1301, the OPEN processing program 511 starts the process. At 1302, the MDS 105 analyzes the content of the received OPEN message and extracts a file name from the message. At 1303, the MDS 105 checks if the file of the extracted file name exists in the file tree of the MDS 105. If the file exists, the MDS 105 proceeds to 1304 and retrieves the file handle assigned to the file.

If the file does not exist, the MDS 105 proceeds to 1305 and creates a new file node on the file tree of the MDS 105 and assigns a new file handle for the new file. At 1306, the MDS 105 creates a new entry for the new file in the layout information 509 according to the configuration of MDS 105. At 1307, after the update of the layout information 509, the MDS 105 checks the configuration status about ACL distribution mode, which defines when the MDS 105 distributes the content of MDS ACL 508 to the DSs 106 and 107. If the mode is configured to the dynamic mode ("DYNAMIC"), the MDS 105 does not invoke the DS ACL creation program. If the mode is configured to the static mode ("STATIC"), the MDS 105 proceeds to 1308 and calls the DS ACL creation program 513.

At 1309, the MDS 105 sets the retrieved or newly assigned file handle to a current NFS session and sends a response for the OPEN message to the pNFS client. At 1310, the process for the OPEN processing program 511 ends.

In an exemplary embodiment, the OPEN message can substitute a file handle for a file name. At 1303, the MDS 105 checks if the extracted file handle is being used as a valid file handle for a file in the MDS 105 in accordance with an exemplary embodiment.

Figure 14:
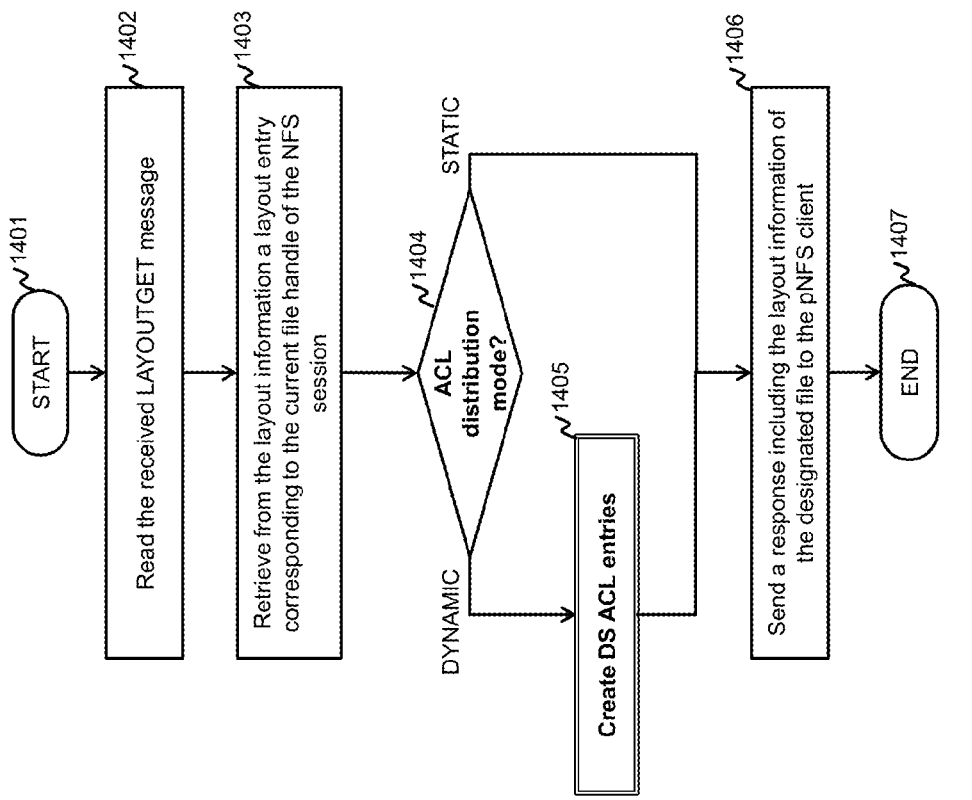
FIG. 14 illustrates a flow chart of the LAYOUTGET processing program of the MDS, in accordance with an exemplary embodiment.

FIG. 14 illustrates a flow chart of the LAYOUTGET processing program 512 of the MDS 105, in accordance with an exemplary embodiment. At the beginning of the process 1401, the LAYOUTGET processing program 512 is invoked when the MDS 105 receives a LAYOUTGET message from the pNFS clients 101-104.

At 1402, the MDS 105 analyzes the content of the received LAYOUTGET message. At 1403, the MDS retrieves a layout information entry corresponding to the current file handle of the current NFS session. For example, the entry 901 in the layout information 509 may be selected, as its file handle matches with the current file handle 0x1, which is checked at the sequence 4008 in the FIG. 4. At 1404, the MDS 105 checks the configuration status of the ACL distribution mode. If the mode is configured to the dynamic mode ("DYNAMIC"), the MDS 105 proceeds to 1405 and calls the DS ACL creation program 512. If the mode is configured to the static mode ("STATIC"), the MDS 105 does not invoke the DS ACL creation program 512. At 1406 the MDS 105 sends a response including the layout information of the designated file to the pNFS client.

Figure 15:
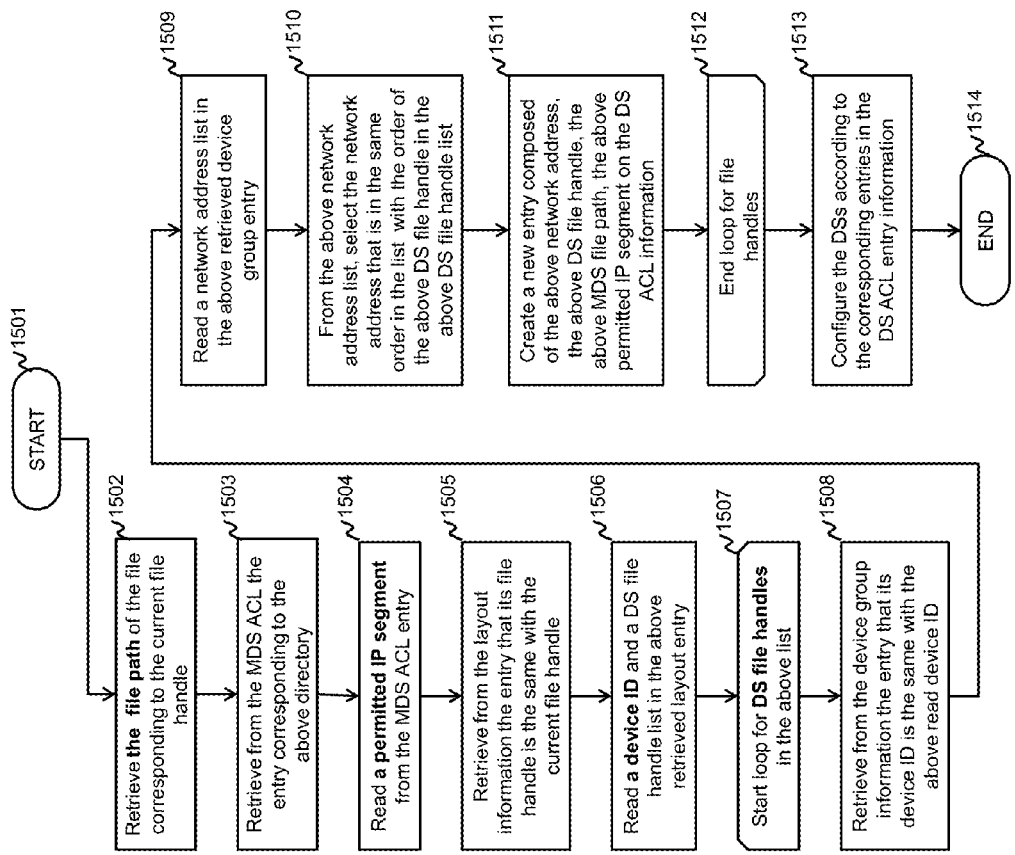
FIG. 15 illustrates a flow chart of the DS ACL creation program of the MDS, in accordance with an exemplary embodiment.

FIG. 15 illustrates the flow chart of the DS ACL creation program 513 of the MDS 105, in accordance with an exemplary embodiment. At 1501, the DS ACL creation program 513 may be invoked from the above described OPEN processing program 511 or the above described LAYOUTGET processing program 512.

At 1502, the MDS 105 retrieves the file path of the file corresponding to the current file handle. At 1503, the MDS 105 retrieves from the MDS ACL 508 the entry that its directory path includes the above retrieved file path. At 1504, the MDS 105 extracts a permitted IP segment from the retrieved ACL entry.

At 1505, the MDS 105 retrieves from the layout information 508 the entry that its file handle is the same with the current file handle. In this example, the first entry 901 in the FIG. 9 may be selected because the file handle is the same with current file handle 0x1 when checked at 2013 in FIG. 2 or at 4008 in FIG. 4. From the above retrieved entry 901, the MDS 105 reads a device ID and a list of file handles of the DSs 106 and 107. In this example, the device ID is "nfsstr1", and the file handles in the list are 0x11 and 0x12.

At 1507, the MDS 105 starts a loop that runs the same process for each file handle in the above list. At 1508, the MDS 105 retrieves from the device group information 510 the entry indicating that its device ID is the same with the above read device ID. In this example, the first entry 1001 of the device group information 510 is selected. At 1509, the MDS 105 extracts a list of network addresses from the entry. From the network address list of the entry, the MDS selects the network address that has the same order in the extracted network address list with the order of the DS file handle in the above DS file handle list at 1510. In this example, the network address "10.0.20.11" is selected at the turn of the DS file handle 0x11, and "10.0.20.12" is selected at the turn of the DS file handle 0x12.

At 1511, the MDS 105 creates a new entry of the DS ACL entry information 506. This new entry may include the above network address selected at 1510, the above DS file handle selected at 1507, the above file path retrieved at 1502, and the above permitted IP segment read at 1504.

The MDS 105 repeats the process from 1508 to 1511 for each of the DS file handles, and then finishes the loop at 1512. Then the MDS 105 configures the DS ACL 108 and 109 of the DSs 106 and 107 according to the corresponding entries in the DS ACL entry information 506. In this example, the entries 601 and 602 are used to configure the DS ACL 108 of the DS 106. Also, the entries 603 and 604 are used to configure the DS ACL 109 of the DS 107.

Second Exemplary Embodiment

Block Layout Using iSCSI

In a second exemplary embodiment, the meta-data server (MDS) has DS Access Control List (ACL) information, with entries for a volume ID of an iSCSI target, a start position of chunk data on a data server (DS), an end position of the chunk data, an original file path of the chunk data, and a list of iSCSI IQNs. The MDS also has client adaptor information with entries for one or more IP addresses of a client's NIC for a Network File System (NFS) protocol access to the MDS, and an iSCSI IQN of the client's NIC. The MDS retrieves an original file path of the chunk data on a DS according to the layout information. Then, the MDS retrieves the export iSCSI IQNs corresponding to the file path according to the client adaptor information and MDS ACL.

Figure 16:
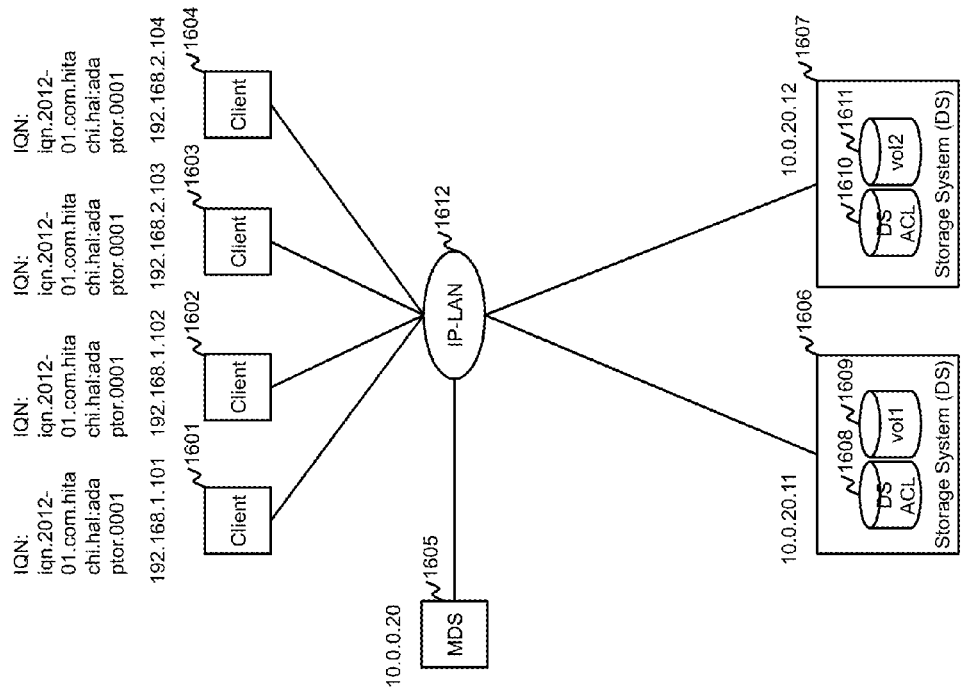
FIG. 16 illustrates an example of a distributed network file system with a meta-data server (MDS) operable to provide block-layout capability, in accordance with an exemplary embodiment.

FIG. 16 illustrates an example of a distributed network file system with a meta-data server (MDS) operable to provide block-layout capability, in accordance with an exemplary embodiment.

The distributed network file system may involve multiple clients 1601-1604 capable of iSCSI, a MDS 1605, and multiple storage systems 1606 and 1607 that have iSCSI capability and work as DSs. These system elements may be connected each other via an IP Local Area Network (IP-LAN) 1612. In the example IP-LAN 1612 of FIG. 16, IP addresses 192.168.1.101, 192.168.1.102, 192.168.2.103, 192.168.2.104, 10.0.0.20, 10.0.20.11, and 10.0.20.12 are assigned to clients 1601-1604, the MDS 1605, and storage systems 1606 and 1607, respectively. Storage system 1606 has a DS ACL 1608 and a volume 1609. Storage system 1607 has a DS ACL 1610 and a volume 1611.

The message sequence between the above components of the second exemplary embodiment is the same as the first exemplary embodiment as described in the FIG. 2-4, and is omitted for clarity.

Figure 17:
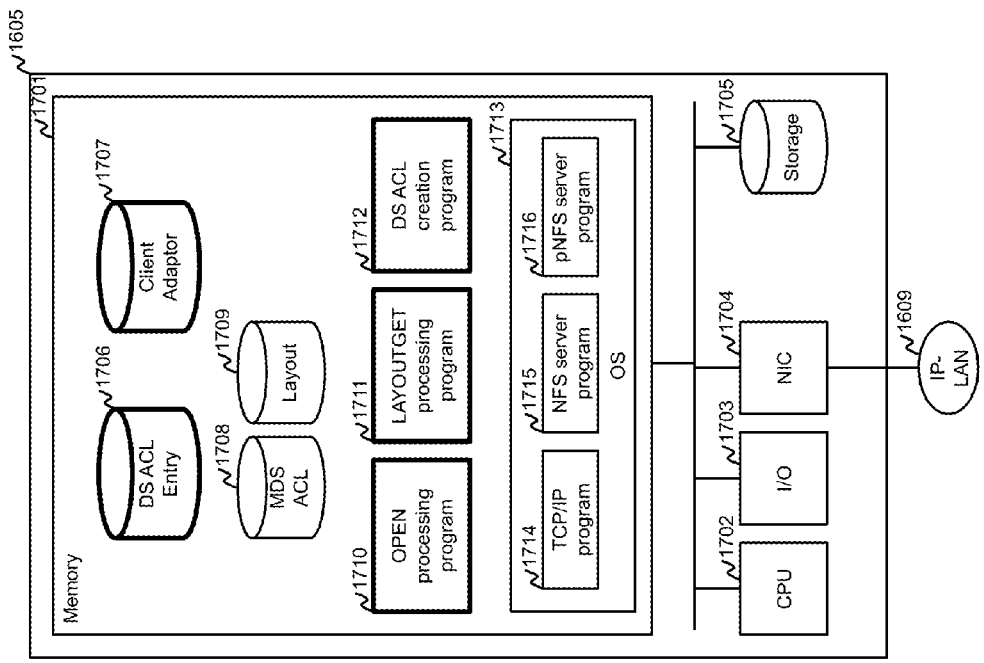
FIG. 17 illustrates an example of the structure of the MDS, in accordance with an exemplary embodiment.

FIG. 17 illustrates an example of the structure of the MDS 1605, in accordance with an exemplary embodiment. In the example of FIG. 17, MDS 1605 includes a memory 1701, a CPU 1702, an I/O 1703, a network interface card (NIC) 1704, and an internal storage 1705. The memory 1701 stores a DS ACL entry information 1706 and a client adaptor information 1707. The memory 1701 also stores MDS ACL information 1708 and layout information 1709, for the block-layout pNFS system. The memory 1701 also stores an OPEN processing program 1710, a LAYOUTGET processing program 1711, and a DS ACL creation program 1712. The memory 1701 also stores an OS 1713 with a TCP/IP program 1714, a NFS server program 1715, and a pNFS server program 1716.

FIG. 18 illustrates an example structure of the DS ACL entry information 1706 in accordance with an exemplary embodiment. In the example of FIG. 18, DS ACL entry information 1706 is implemented as a table containing entries that include the volume ID of a volume, the start address and the end address of the range of chunk data in a volume, an original file path, and a list of the permitted IQNs. In this example, four entries 1801-1804 are stored in the DS ACL entry information 1706. The content of the entries 1801-1804 indicate that the data of two files "/dir1/file1.dat" and "/dir2/file2.dat" is stored in two volumes that have volume IDs "vol1" and "vol2", respectively. Entries 1801-1804 also indicate that the data of two files is exported to two groups of iSCSI initiators, respectively. The first group contains two iSCSI initiators that have IQNs "iqn.2012-01.com.hitachi.hal:adaptor.0001" and "iqn.2012-01.com.hitachi.hal:adaptor.0002", as shown in entries 1801 and 1803. The second group contains two iSCSI initiators that have IQNs "iqn.2012-01.com.hitachi.hal:adaptor.0003" and "iqn.2012-01.com.hitachi.hal:adaptor.0004", as shown in entries 1802 and 1804.

Similar to the first exemplary embodiment as described above, the MDS 1605 manages entries of the DS ACLs 1608 and 1610. Each entry indicates the correspondence among an range of chunk data on a DS 1606 or 1607, an identification of a file on a file tree of the MDS 1605, and a list of identifications of iSCSI initiators that are able to access the chunk data.

FIG. 19 illustrates an example of the structure of the client adaptor information 1707, in accordance with an exemplary embodiment. In the example of FIG. 19, client adaptor information is arranged as a table with entries 1901-1904 that include a client IP address and an IQN. Each entry corresponds to a pNFS client assigned the IP address and the IQN in the entry. In this example, the four pNFS clients 1601-1604 have iSCSI capability according to the table of FIG. 19.

The structure of the MDS ACL 1708 is the same as the structure of the MDS ACL 508 in the first exemplary embodiment. The description of the structure is therefore omitted for clarity.

FIG. 20 illustrates an example of the layout information 1709, in accordance with an exemplary embodiment. In the example of FIG. 20, the layout information 1709 is implemented as a table. Each of the entries 2001-2004 in the layout information 1709 are directed to chunk data. The layout for a file can be described as a set of multiple entries in the layout information 1709. For example, entries 2001 and 2002 correspond to a file named "/dir1/file1.dat" and the respective chunk data.

FIG. 21 illustrates an example structure of DS ACLs 1608 and 1610, in accordance with an exemplary embodiment. In the example of FIG. 21, the DS ACL is implemented as a table. Each entry 2101, 2102 corresponds to a range of chunk data on the volumes 1609 and 1611. In the example of FIG. 21, the size of chunk data is the same between two volumes 1609 and 1611. Therefore, the content of the DS ACLs 1608 and 1610 is the same. In this example, the first 4500 bytes in the volumes 1609 and 1611 is for the file named "/dir1/file1.dat". It is implied that the pNFS clients 101 and 102, which have IQN "iqn.2012-01.com.hitachi.hal:adaptor-0001" and "iqn.2012-01.com.hitachi.hal:adaptor-0002" respectively, can access the chunk data of the file named "/file1.dat", as shown in entry 2101.

Figure 22:
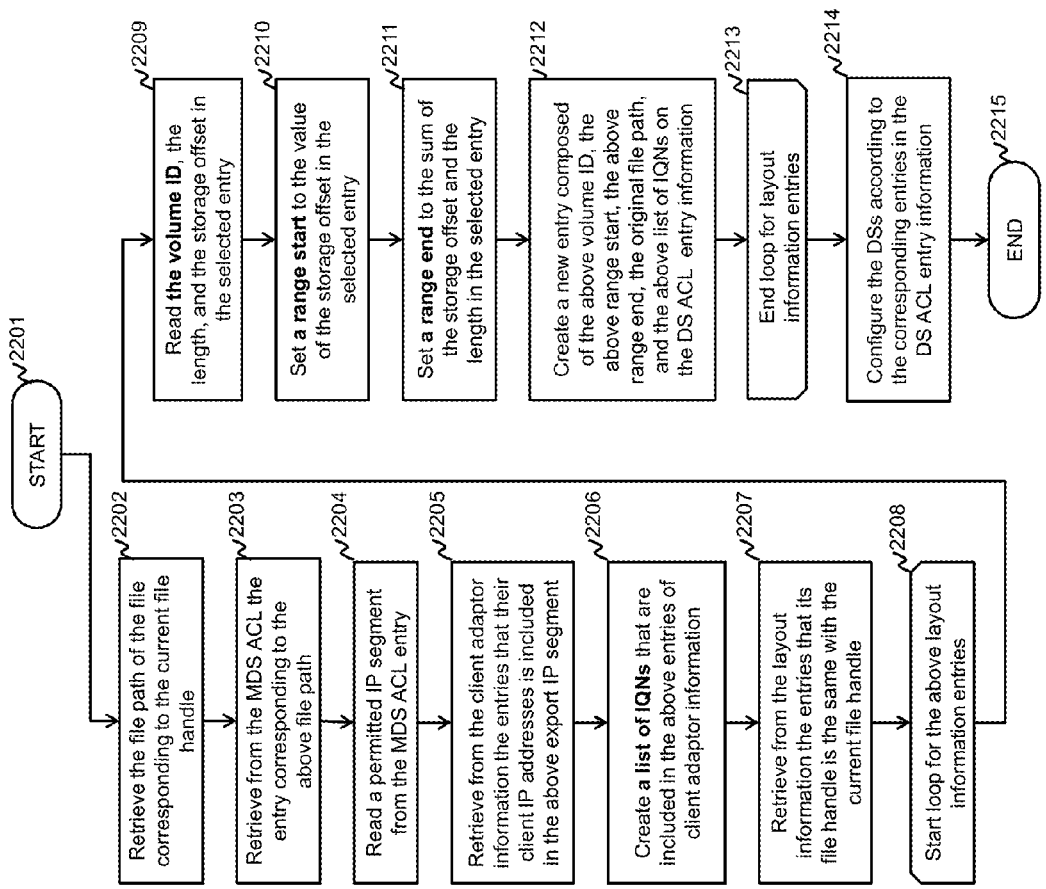
FIG. 22 shows an example of the flow chart of the DS ACL creation program, in accordance with an exemplary embodiment.

FIG. 22 shows an example of the flow chart of the DS ACL creation program 1712, in accordance with an exemplary embodiment. This program is launched from the OPEN processing program 1710 or the LAYOUTGET processing program 1711 at 2201.

At 2202, the MDS 1605 retrieves the file path of the file corresponding to the current file handle. In this example, the file path "/dir1/file1.dat" corresponds to the file handle 0x1. At 2203, the DS ACL creation program 1712 retrieves the entry corresponding to the above retrieved file path from the MDS ACL 1708. In this example, the first entry 801 of the MDS ACL 508 is selected. From this selected entry, the MDS 1605 reads a permitted IP segment at 2204. In this example, "192.168.1.0/24" is read. From the client IP address information 1707, the MDS 1605 then retrieves the entries that the value of their client IP addresses is included in the above read IP segment at 2205. In this example, the entries 1901 and 1902 are selected. At 2206, the MDS 1605 extracts IQNs from these selected entries and creates a list of the IQNs. In this example, the list contains two IQNs; "iqn.2012-01.com.hitachi.hal:adaptor-0001" and lqn.2012-01.com.hitachi.hal:adaptor-0002".

At 2207, from the layout information 1709, the MDS 1605 retrieves the entries with the same file handle as the current file handle. In this example, the entries 2001 and 2002 are selected as they have the file handle 0x1. At 2208, the MDS 1606 starts a loop to run a set of processes for each of the entries selected from the layout information 1709. In this loop, the MDS 1605 reads the volume ID, the length, and storage offset from the entry at 2209. At 2210, the MDS 1605 sets a range start to the value of the above read storage offset. At 2211, the MDS 1605 sets a range end to the sum of the above storage offset and the above length. At 2212, the MDS 1605 creates a new entry for the DS ACL entry information 1706. The new entry may include the above volume ID, the above range start, the above range end, the original file path, and the above list of IQNs. After creating the new entry, the MDS 1605 finishes the loop regarding layout information entries at 2213. At 2214, the MDS 1605 configures the DS ACL 1608 and 1610 of the DSs 1606 and 1607 according to the corresponding entries in the DS ACL entry information 1706. The program terminates at 2215.

The MDS 1605 determines the mapping between the range of chunk data on a DS and a list of IQNs of the clients 1601-1604. By determining and maintaining the mapping, the MDS may thereby keep security consistency between the data path and the control path despite the different protocols (iSCSI and NFS) utilizing different identifications (IQNs and IP addresses).

Third Exemplary Embodiment

Block Layout Using FC

In a third exemplary embodiment, meta-data server (MDS) manages DS Access Control List (ACL) information, with entries for a volume ID of a Fibre Channel (FC) storage, a start position of a chunk data on a data server (DS), an end position of the chunk data, an original file path of the chunk data, and a list of FC World Wide Name (WWNs). The MDS also manages client adaptor information with entries for one or more IP addresses of a client's NIC for a Network File System (NFS) protocol access to the MDS, and a FC WWN of the client's Host Bus Adaptor (HBA). The MDS retrieves an original path of the chunk data on a DS according to the layout information. Then, the MDS retrieves the export FC WWNs corresponding to the file path according to the client adaptor information and MDS ACL.

Figure 23:
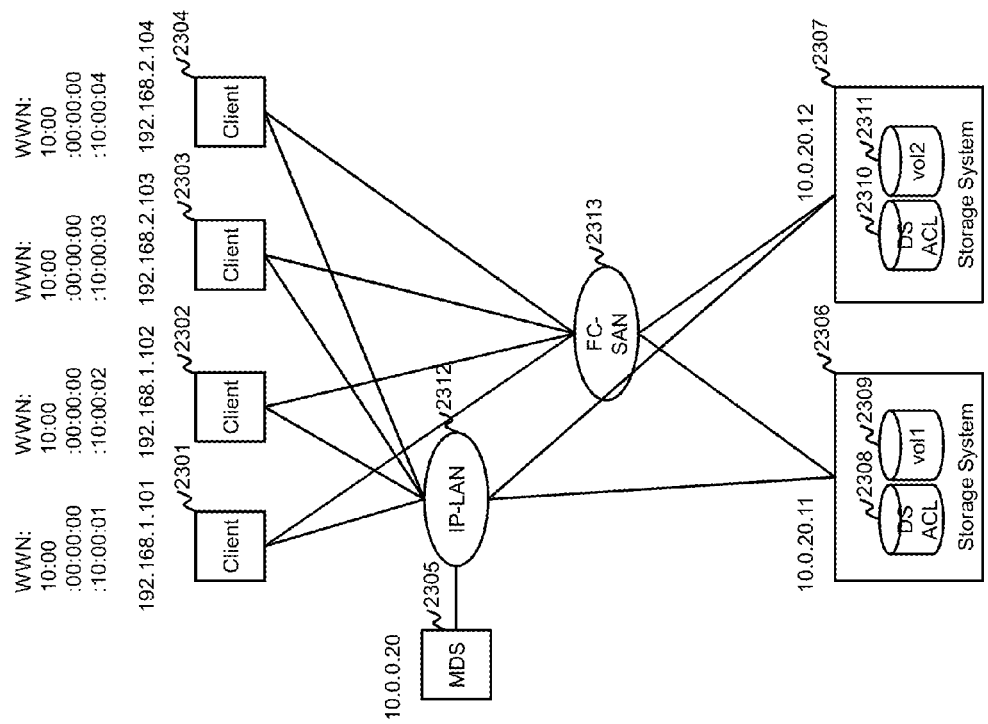
FIG. 23 illustrates an example of a distributed network file system with a meta-data server (MDS) that provides block-layout capability, in accordance with an exemplary embodiment.

FIG. 23 illustrates an example of a distributed network file system with a meta-data server (MDS) that provides block-layout capability, in accordance with an exemplary embodiment. The system may include multiple clients 2301-2304 with FC capability, a MDS 2305, multiple storage systems 2306 and 2307 with FC capability and that operate as DSs. These components may be connected each other via an IP Local Area Network (IP¬ LAN) 2312. In this IP-LAN 2312, IP addresses 192.168.1.101, 192.168.1.102, 192.168.2.103, 192.168.2.104, 10.0.0.20, 10.0.20.11, 10.0.20.12 are assigned to the clients 2301-2304, the MDS 2305, and the storage systems 2306 and 2307, respectively. The clients 2301-2304 and the storage systems 2306 and 2307 are connected with each other via a Fibre Channel Storage Area Network (FC-SAN) 2313. World Wide Names (WWNs) 10:00:00:00:00:10:00:01, 10:00:00:00:00:10:00:02, 10:00:00:00:00:10:00:03, and 10:00:00:00:00:10:00:04 are assigned to Host Bus Adaptors (HBAs) of clients 2301-2304. The storage system 2306 has a DS ACL 2308 and a volume 2309. The storage system 2307 has a DS ACL 2310 and a volume 2311.

The structure of the MDS 2305 is the same as the structure of the MDS 1605.

FIG. 24 illustrates an example of the DS ACL entry information 1706 of the MDS 2305, in accordance with an exemplary embodiment. In the example of FIG. 24, DS ACL entry information is implemented as a table with entries for a volume ID, the start address and end address of the range of chunk data in a volume, an original file path, and a list of the permitted FC WWNs. In this example, four entries 2401-2404 are stored in the DS ACL information 1706. The entries indicate that the data of two files "/dir1/file1.dat" (as shown in entries 2401 and 2403) and "/dir2/file2.dat" (as shown in entries 2402 and 2404) is stored in two volumes that have volume IDs "vol1" and "vol2", respectively. The entries further indicate that the data of two files is exported to two groups of FC HBAs, respectively. The first group contains two FC HBAs that have FC WWNs "10:00:00:00:00:10:00:01" and "10:00:00:00:00:10:00:02", as shown in entries 2401 and 2402. The second group contains two FC HBAs that have FC WWNs "10:00:00:00:00:10:00:03" and "10:00:00:00:00:10:00:04", as shown in entries 2403 and 2404.

FIG. 25 illustrates an example structure of the client adaptor information 1707, in accordance with an exemplary embodiment. In the example of FIG. 25, the client adaptor information 1707 is a table with entries for a client IP address and an FC WWN. Each entry 2501-2504 corresponds to a pNFS client assigned the IP address and the FC WWN in the entry. In this example, all four pNFS clients 2301-2304 have FC capability, as indicated by respective entries 2501-2504.

The MDS ACL 1708 and layout information 1709 is used as is in the second exemplary embodiment as noted above.

FIG. 26 illustrates an example structure of one of the DS ACLs 2308, in accordance with an exemplary embodiment. In the example of FIG. 26, the DS ACL 2308 is implemented as a table with each entry 2601-2602 corresponding to a range of chunk data on the volumes. In this example, the size of chunk data is the same between two volumes 2309 and 2311. Therefore, the content of the DS ACLs 2308 and 2310 is the same. In this example, the first 4500 bytes in the volumes 2309 and 2311 is used for the file named "/dir1/file1.dat", as noted in entry 2601. Entry 2601 indicates that the pNFS clients 2301-2304 that have FC WWNs "10:00:00:00:00:10:00:01" and "10:00:00:00:00:10:00:02" respectively, can access the chunk data of the file named "/dir1/file1.dat".

The flow chart of the OPEN processing program 1710 is the same with the flow chart shown in the FIG. 13.

The flow chart of the LAYOUTGET processing program 1711 is the same with the flow chart shown in the FIG. 14.

The flow chart of the DS ACL creation program 1712 is the same with the flow chart shown in the FIG. 22 except that the IQNs in the flow chart as shown in the FIG. 22 are replaced with FC WWNs.

Although a few exemplary embodiments have been shown and described, these exemplary embodiments are provided to convey the subject matter described herein to people who are familiar with this field. It should be understood that the subject matter described herein may be embodied in various forms without being limited to the described exemplary embodiments. The subject matter described herein can be practiced without those specifically defined or described matters or with other or different elements or matters not described. It will be appreciated by those familiar with this field that changes may be made in these exemplary embodiments without departing from the subject matter described herein as defined in the appended claims and their equivalents. For example, several implementations described above utilize a table, however, such implementations are not limited to a table. Other implementations known to one of ordinary skill in the art may also be utilized (e.g. arrays, stacks, etc.)

Portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the exemplary embodiments, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The exemplary embodiments also relate to an apparatus for performing the operations herein. This apparatus may be specially constructed for the required purposes, or it may include one or more general-purpose computers selectively activated or reconfigured by one or more computer programs. Such computer programs may be stored in a non-transitory computer readable medium or a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the exemplary embodiments are not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the exemplary embodiments may be implemented using circuits and logic devices (hardware), while other aspects may be implemented using instructions stored on a machine-readable medium (software), which if executed by a processor, would cause the processor to perform a method to carry out the exemplary embodiments. Furthermore, some exemplary embodiments may be performed solely in hardware, whereas other exemplary embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the exemplary embodiments will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the embodiments being indicated by the following claims.

What is claimed is:

1. A meta data server coupled to a plurality of client computers and a plurality of data servers, comprising:
   a memory configured to store an indication of a relationship among first identification information indicating a data server, second identification information identifying a location of a file, and third identification information associated with a client computer; and
   a controller operable to:
   manage first access control information in the meta data server based on a layout information for a file subject to an access request from the client computer; and control access from the client computer identified by the third identification information to the data server identified by the first identification information, by creating or updating second access control information in the data server based on the first access control information of the meta data server, and executing access control by the data server according to the second access control information for a chunk data identified by the layout information, wherein the second access control information in the data server identifies another relationship between each file and related chunk data stored in a storage system identified by the layout information, and is configured to be used for the access control for the chunk data by the data server;

wherein the second identification information further comprises file path information and file name information of the file;

wherein the third identification information comprises at least one Internet Protocol (IP) address segment; and wherein the controller controls the access from the client computer based on the relationship in the memory and an address segment of the client computer.

2. The meta data server of claim 1, wherein the second identification information comprises block information of the file;

wherein the third identification information comprises at least one internet small computer system interface qualified name (IQN); and wherein the controller controls the access from the client computer based on the relationship in the memory and the IQN of the client computer.

3. The meta data server of claim 1, wherein the second identification information comprises block information of the file;

wherein the third identification information comprises at least one Fibre Channel (FC) World Wide Name (WWN); and wherein the controller controls the access from the client computer based on the relationship in the memory and the FC-WWN of the client computer.

4. The meta data server of claim 1, wherein the memory further stores an open processing program operable to configure the plurality of data servers to control access from the plurality of client computers based on the third identification information when executed in a first mode, and further operable to generate a response comprising a file handle.

5. The meta data server of claim 4, wherein the memory further stores a layout processing program operable to configure the plurality of data servers to control access from the plurality of client computers based on the third identification information when executed in a second mode, and further operable to generate a response comprising the layout information.

6. The meta data server of claim 5, wherein the controller is further configured to change a mode of the meta data server from the second mode to the first mode, or from the first mode to the second mode.

7. The meta data server of claim 1, wherein the controller in response to a request to create another file, is configured to update the second identification information based on the another file and update the third identification information based on the request.

8. The meta data server of claim 1, wherein the meta data server is integrated into a parallel Network File System (pNFS).

9. A system, comprising:
a plurality of client computers;
a plurality of data servers; and
a meta data server coupled to the plurality of client computers and the plurality of data servers, comprising:
a memory configured to store an indication of a relationship among first identification information indicating a data server, second identification information identifying a location of a file, and third identification information associated with a client computer; and
a controller operable to:
manage first access control information in the meta data server based on a layout information for a file subject to an access request from the client computer; and to control access from the client computer identified by the third identification information to the data server identified by the first identification information, by creating or updating second access control information in the data server based on the first access control information of the meta data server, wherein the data server is configured to execute access control according to the second access control information for a chunk data identified by the layout information, wherein the second access control information in the data server identifies another relationship between each file and related chunk data stored in a storage system identified by the layout information, and is configured to be used for the access control for the chunk data by the data server;

wherein the second information further comprises file path information and file name information of the file;

wherein the third identification information comprises at least one Internet Protocol (IP) address segment; and wherein the controller controls the access from the client computer based on the relationship in the memory and the IP address segment of the client computer.

10. The system of claim 9, wherein the second information comprises block information of the file;

wherein the third identification information comprises at least one internet small computer system interface qualified name (IQN); and wherein the controller controls the access from the client computer based on the relationship and the IQN of the client computer.

11. The system of claim 9, wherein the second information comprises block information of the file;

wherein the third identification information comprises at least one Fibre Channel (FC) World Wide Name (WWN); and wherein the controller controls the access from the client computer based on the relationship and the FC-WWN of the client computer.

12. The system of claim 9, wherein the memory further stores an open processing program operable to configure the plurality of data servers to control access from the plurality of client computers based on the third identification information when executed in a first mode, and further operable to generate a response comprising a file handle.

13. The system of claim 12, wherein the memory further stores a layout processing program operable to configure the plurality of data servers to control access from the plurality of client computers based on the third identification information when executed in a second mode, and further operable to generate a response comprising the layout information.

14. The system of claim 13, wherein the controller is further configured to change a mode of the meta data server from the second mode to the first mode, or from the first mode to the second mode.

15. The system of claim 9, wherein the controller in response to a request from one of the plurality of clients to create another file, is configured to update the second identification information based on the another file and update the third identification information based on the request.

16. The system of claim 9, wherein the system is a parallel Network File System (pNFS).

17. A non-transitory computer readable medium storing instructions for operating a meta data server, the instructions comprising:

managing an indication of a relationship among first identification information indicating a data server, second identification information identifying a location of a file, and third identification information associated with a client computer;

managing first access control information in the meta data server based on layout information for the file subject to an access request by the client computer, and controlling access from the client computer identified by the third identification information to the data server identified by the first identification information, by creating or updating second access control information in the data server based on the first access control information of the meta data server, wherein the data server is configured to execute access control according to the second access control information for a chunk data identified by the layout information, wherein the second access control information in the data server identifies another relationship between each file and related chunk data stored in a storage system identified by the layout information, and is configured to be used for the access control for the chunk data by the data server;

wherein the second information further comprises file path information and file name information of the file;

wherein the third identification information comprises at least one Internet Protocol (IP) address segment; and wherein the controlling the access from the client computer is based on the relationship in the memory and an address segment of the client computer.

\* \* \* \* \*